United States Patent [19]
Ellis et al.

[11] Patent Number: 4,838,203
[45] Date of Patent: Jun. 13, 1989

[54] MILKING CLAW RETRACTION AND RETENTION DEVICE FOR MILKING MACHINE

[75] Inventors: Michael W. Ellis, Kansas City, Mo.; Mofazzal H. Chowdhury, Lenexa, Kans.

[73] Assignee: Alfa-Laval, Inc., Fort Lee, N.J.

[21] Appl. No.: 75,974

[22] Filed: Jul. 21, 1987

[51] Int. Cl.$^4$ .............................................. A01J 5/04
[52] U.S. Cl. ................................. 119/14.08; 119/14.1
[58] Field of Search ................ 119/14.1, 14.01, 14.08, 119/14.13, 14.14

[56] References Cited

U.S. PATENT DOCUMENTS

| | | | |
|---|---|---|---|
| Re. 29,848 | 11/1978 | Schluckbier et al. | 119/14.08 |
| 3,115,116 | 12/1963 | Schilling et al. | 119/14.08 |
| 3,690,300 | 9/1972 | Tonelli | 119/14.08 |
| 3,789,798 | 2/1974 | Reisgies et al. | 119/14.08 |
| 3,861,355 | 1/1975 | Johnson et al. | 119/14.08 |
| 3,893,422 | 7/1975 | Schnitzler et al. | 119/14.08 |
| 3,929,103 | 12/1975 | Schluckbier | 119/14.08 |
| 3,931,794 | 1/1976 | Chillingworth | 119/14.08 |
| 3,938,470 | 2/1976 | Pace | 119/14.1 |
| 3,957,018 | 5/1976 | Barrett | 119/14.08 |
| 3,973,520 | 8/1976 | Flocchini | 119/14.08 |
| 4,022,158 | 5/1977 | Flocchini | 119/14.14 |
| 4,034,713 | 7/1977 | Umbaugh | 119/14.02 |
| 4,056,077 | 11/1977 | Schluckbier | 119/14.08 |
| 4,223,635 | 9/1980 | Akerman | 119/14.02 |
| 4,228,763 | 10/1980 | Heidecker et al. | 119/14.08 |
| 4,228,764 | 10/1980 | Plett | 119/14.08 |
| 4,231,323 | 11/1980 | Olander | 119/14.08 |
| 4,263,874 | 4/1981 | Flocchini | 119/14.08 |
| 4,333,421 | 6/1982 | Schluckbier | 119/14.08 |
| 4,523,545 | 6/1985 | Kummer | 119/14.08 |

FOREIGN PATENT DOCUMENTS 1667  5/1979  European Pat. Off. ......... 119/14.08

OTHER PUBLICATIONS

De Laval Brochure, "Pipeline Milking Systems," 1980, p. 17.

Primary Examiner—Robert P. Swiatek
Attorney, Agent, or Firm—Davis Hoxie Faithfull & Hapgood

[57] ABSTRACT

The present invention provides an apparatus for use in conjunction with a milking machine for reducing the incidence of milking claw or cluster contamination following uncoupling and retraction of the milking claw or cluster from an animal. The milking claw is retracted from the animal by the application of negative pressure and is retained in a retracted position by a retaining device which retains the milking claw in a predetermined position, even when the milking machine is turned off or, in the case of a portable machine, transported to another location.

24 Claims, 4 Drawing Sheets

MILKING CLAW RETRACTION AND RETENTION DEVICE FOR MILKING MACHINE

BACKGROUND OF THE INVENTION

1. Field of the Invention

The present invention relates to apparatus for removing the milking cluster or claw of an automatic milking system from an animal such as a cow when the flow of milk therefrom diminishes to a predetermined level. More particularly, the invention relates to apparatus for maintaining the milking claw in a retracted position when the milking machine is uncoupled from all power and vacuum supplies.

2. Description of the Related Art

Automatic milking machines are widely used in a variety of types of dairies such as in stanchion and tiestall dairies. Many of these milking machines include apparatus for automatically removing the milking cluster or claw from the udder of the cow being milked when the milk flow level has diminished to a predetermined level. The milking claw is then attached to an adjacent cow to be milked, and the process is repeated until all the cows within the service area of the milking machine have been milked. Thereafter, a new group of animals is brought to the milking machine or, in the case of portable machines, the milking machine is transported to another animal or group of animals to be milked. This invention pertains particularly to portable milking machines, although it can be used with more permanently fixedly mounted machines as well.

The automatic milking claw removal devices of milking machines generally use a vacuum powered cylinder for removing the claw from the cow's udder and retracting the claw to a predetermined position away from the cow. An example of such a removal device is disclosed in U.S. Pat. No. 3,690,300, the disclosure of which is hereby expressly incorporated by reference. U.S. Pat. No. 3,690,300 discloses an apparatus for removing the teat cups of a milking claw in response to the detection of milk flow at a predetermined level. Milk flow is detected by a flow indicator positioned in the milk flow line between the milking claw and the milk collection reservoir. When the milk flow diminishes to the prescribed threshold value, the flow indicator emits a signal which actuates means for reducing the vacuum pressure at the milking claw and supplying atmospheric air into the claw, prior to removal of the teat cup cluster thereof. The milking claw is then retracted through activation of the vacuum cylinder. The cylinder, which is generally vertically oriented, includes therein a reciprocably-mounted piston movable in response to a change in pressure in the space between the cylinder and top of the piston. The milking claw is coupled to the piston through a cord which extends from the piston and outwardly from the cylinder. The cylinder space above the piston is connected through an inlet to the vacuum line used to effect milking of the cow. Upon completion of the milking, as indicated by the reduction in milk flow to the predetermined level, the piston is drawn upwardly by the vacuum to withdraw the cord into the cylinder and lift the milking claw from the cow. Other examples of milking claw removal apparatus are disclosed in U.S. Pat. Nos. 4,523,545 and Re. 29,848.

A problem arises, however, when the milking machine is to be transported from one location to another within the dairy or is otherwise shut off or disconnected from its electrical and vacuum supply lines. When either of these events occurs, the piston and attached milking claw are drawn by the force of gravity to the floor, absent coupling of the claw with a suitable retention device. When the milking claw drops to the floor, it becomes needlessly contaminated, thereby causing delay in the milking process until the milking claw is properly cleansed. Attempts to correct this problem have included provision of a hook or similar retaining member to the cylinder upon which the milking claw can be suspended or, in the case with portable machines, the operator's carrying of the milking machine in one hand and the milking claw in the other hand. Neither of these corrective measures is acceptable because they do not adequately prevent the possibility of contamination. In addition, these measures necessitate additional time or handling on the part of the operator.

Accordingly, it is an object of the present invention to provide a milking claw retraction and retention device which overcomes the aforedescribed disadvantages and reliably secures the milking claw in a retracted position away from the ground.

Another object of the present invention is to provide a milking claw retraction and retention device which is simple to operate and minimizes the need for operator supervision.

Another object of the present invention is to provide a milking claw retraction and retention device which operates automatically to retract the milking claw from a cow and retain the claw in a retracted position upon determination of a milk flow at a predetermined level.

Yet another object of the present invention is to provide a milking claw retraction and retention device which maintains the milking claw in a retracted position following withdrawal of the claw from the animal, even when the supply of electricity and negative pressure to the machine is shut off.

Still another object of the present invention is to provide a milking claw retraction and retention device which is simple in design and inexpensive to manufacture.

SUMMARY OF THE INVENTION

The present invention provides an apparatus for removing the milking cluster or claw of a milking machine from an animal such as a milking cow and retaining the milking claw in a retracted position away from the milked animal. The milking claw is connectable to the milk and vacuum lines of the milking machine. The milking machine includes a cylindrical housing having first and second ends and a wall which defines a generally cylindrical cavity, a piston reciprocable within the housing cavity between the housing ends, and means for introducing negative pressure between the first housing end and the piston. The piston is coupled to the milking claw through a cord, one end of which is coupled to the piston. The second end of the cord extends outwardly from the cylinder through an aperture formed in the second housing end and is provided with means for coupling with the milking claw. When negative pressure is applied between the piston and the first housing end, the piston moves toward the first housing end to retract a portion of the cord into the housing. The cord has a sufficient length so that at least a portion of the cord adjacent its second end extends outwardly from the aperture in the second housing end when the negative pressure is applied to the piston and the cord is retracted into the housing. Means is provided for fixing the length of the cord extending outwardly from the aperture so that the milking claw is retained in a predetermined position adjacent the aperture after the piston has been drawn to the position adjacent the first housing end, even following cessation of the supply of negative pressure.

In a first embodiment, the cord length fixing means comprises means reciprocably extensible to at least partially obstruct the aperture. The cord length fixing means further comprises a retaining member which is positioned within the housing adjacent the aperture when the piston is retracted to a position adjacent the first housing end. In one aspect of the first embodiment, the means for fixing the cord length comprises pressure responsive retaining means having a pin member biased to occlude at least a portion of the housing aperture to prevent passage of the cord retaining member therethrough. The pin is retractable from the aperture when negative pressure is selectively supplied to the retaining means. The retaining means can further comprise a cylindrical housing having a diaphragm which divides the housing into discrete first and second chamber portions. The first chamber portion includes the pin biasing member and an inlet for introducing negative pressure to the housing of the retaining means. The second chamber portion can include an inlet for atmospheric pressure. Atmospheric pressure in the second chamber portion urges the pin member away from the aperture when it exceeds the sum of both the negative pressure in the first chamber portion and the force exerted by the pin biasing member.

Another aspect of the first embodiment provides that the reciprocably extensible means comprises check means biased by a spring member and that the cord length fixing means comprises a retaining member secured to the cord. The retaining member preferably includes a side wall which is tapered inwardly toward the housing. The spring member is interposed between the check means and a wall member. The wall member is selectively movable relative to the check means to vary the force exerted by the spring against the check means.

In another aspect of the first embodiment, the aperture comprises first and second aperture sections, the first section being dimensioned so as to prevent passage of the retaining member therethrough once it has been withdrawn into the housing. The second aperture section is dimensioned to permit passage of the retaining member therethrough. The first and second aperture sections are arranged such that the cord is directed toward the first aperture section once it has been withdrawn into the cylinder. The first aperture section can be defined by a wall which extends at an angle outwardly and away from the second aperture section so that when the retaining member is withdrawn into the housing, it is directed toward the second aperture portion.

In a third aspect of the first embodiment, the retaining member comprises a deformable ball member configured to deform and pass through the aperture upon application of a compression force in excess of a predetermined minimum value which is in excess of the force generated by the weight of the milking claw suspended from the second cord end.

In a second embodiment, the means for fixing the length of the cord comprises a latch coupling having a latch pin cooperable with a latch member. The latch pin includes an outwardly flared head portion and extends from the first housing end toward the piston. The latch member is positioned along an upper surface of the piston and is configured to resiliently engage the head portion of the pin to retain the piston adjacent the first housing end when the negative pressure has drawn the piston toward the first housing end. The latch member releases the pin when the piston is drawn toward the second housing end by a predetermined force in excess of the force generated by the weight of the milking claw.

BRIEF DESCRIPTION OF THE DRAWINGS

These and other objects and advantages will become apparent from review of the detailed description and attached drawings, wherein.

DETAILED DESCRIPTION OF THE PREFERRED EMBODIMENTS

Figures 1, 2:
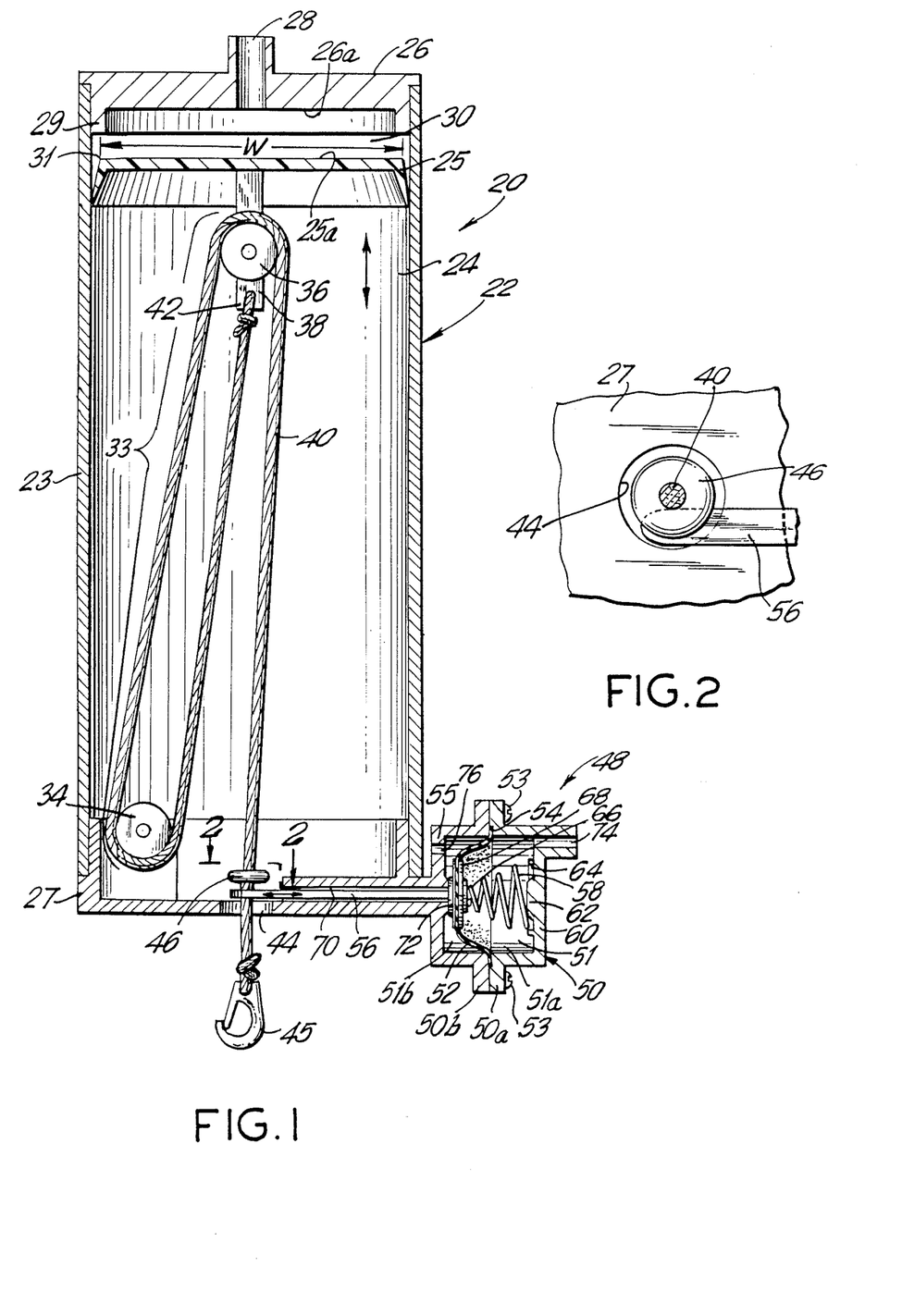
FIG. 1 is a sectional view of a first embodiment of the invention.
FIG. 2 is a view along the line 2—2 of FIG. 1.

Referring now the drawings, wherein like reference numerals represent similar parts throughout the drawings, and in particular to FIGS. 1 and 2, a milking claw retraction and retention device is designated generally by reference numeral 20. The retraction and retention device 20 includes a cylindrical housing 22 having a housing wall 23 which defines a cylindrical housing cavity 24 therein. A piston 25 is movably mounted within housing cavity 24 between first and second end caps 26 and 27, respectively. End caps 26 and 27 are secured to the housing wall 23 in a conventional manner, as by use of a suitable adhesive or by the engagement of threads formed along the surface of the caps with corresponding grooves formed along the interior surface of the housing wall 23. Preferably, the housing 22 is oriented substantially vertically to provide for a more compact configuration. A vacuum inlet 28 is provided in end cap 26 in order to evacuate the space 30 between the end cap 26 and the upper surface 25a of the piston 25. As shown, the inlet 28 is centrally positioned in end cap 26. However, the inlet 28, or a plurality of inlets, may be provided elsewhere along end cap 26 or along housing wall 23 to effect evacuation of space 30. It will be appreciated that the evacuation of the space 30 between piston 25 and end cap 26 will draw the piston 25 toward the end cap 26, as is set forth in detail below.

A cord 40 extends from the piston 25 outwardly from the housing 22 through an aperture 44 formed in end or closure cap 27. A claw hook 45 is provided adjacent the end of cord 40 extending through aperture 44 for coupling with the milking claw of a milking machine (not shown). Hook 45 may be secured to the cord 40 in any conventional manner, as by a knot tied in the cord, as shown. Preferably the cord is connected to piston 25 through suitable retraction means, such as pulley system 33, as shown. Pulley system 33 includes a first pulley wheel 34 fixedly mounted to housing wall 23 or to end cap 27 and a second pulley wheel 36 coupled to piston 25. As shown, pulley wheel 36 is coupled to piston 25 through mounting arm 38 which extends from the piston away from end cap 26. Besides supporting the pulley wheel 36, mounting arm 38 acts as a bumper or stop to prevent the piston 25 from striking the pulley wheel 34. Pulley system 33 is provided to guide cord 40 as it is retracted into housing cavity 24 upon movement of piston 25 toward end cap 26 and to permit use of cords having lengths considerably larger than that of the housing 22. The end of the cord opposite claw hook 45 is secured to the lower end 42 of arm 38 extending from piston 25. From this position, the cord 40 extends around first wheel 34 and over movable wheel 36 to pass through aperture 44.

The milk claw retraction and retention device 20 can be used with a conventional portable or stationary milking machine (not shown), such as that disclosed in U.S. Pat. No. 3,690,300 discussed above, having means for sensing the flow of milk from the cow to which the milking claw is coupled. The milking claw, such as that disclosed in U.S. Pat. No. 3,690,300, typically includes a plurality of teat cups for vacuum coupling to the teats of the animal to be milked. When the detected flow of milk diminishes to a predetermined flow level, the milking claw is automatically uncoupled from the cow, as by terminating the vacuum supply to the teat cups, and suitable valve means (not shown) is engaged to direct negative pressure to the space 30 between piston 25 and end cap 26 of the claw retraction and retention device 20. Application of negative pressure to space 30 draws the piston 25 from a position adjacent aperture 44 to a position adjacent end cap 26. Movement of the piston 25 in this fashion draws the attached cord 40 inward, thereby retracting the milking claw to a position away from the cow. It will be appreciated that the vacuum supplied to the space 30 between the piston 25 and end cap 26 is sufficiently great to overcome both the weight of the milking claw and to retract the milking claw with sufficient force so that its progress is not substantially affected by impediments in its path or by movement of the cow.

Piston 25 maintains its position adjacent end cap 26 so long as vacuum is supplied to the space 30 between the piston and the end cap. The piston is preferably formed from a suitably durable, resilient material such as nylon or plastic to provide an effective vacuum seal between the piston 5 and the housing wall 23. A sealing gasket such as an O-ring may optionally be provided to effect the vacuum seal. Preferably, the seal is sufficient to moderate the speed with which the piston 25 travels toward closure cap 27 when the vacuum supplied to space 30 is terminated.

The opposing faces 25a and 26a of the piston 25 and end cap 26, respectively, are preferably configured to ensure that the negative pressure acts substantially across the entire width W of upper piston surface 25a to provide for smooth, even movement of the piston toward the end cap. A large piston-end cap abutting surface area is obtained by configuring the lateral edge of the end cap face 26a such that it forms a downwardly extending flange 29 that abuts against the outer edge 31 of piston the 25. As shown in FIG. 1, this arrangement restricts movement of the piston toward the end cap beyond the point at which the piston contacts the flange 29.

A problem arises, however, when the milking machine is turned off following retraction of the milking claw or when the machine is moved from one area of the dairy to another. It will be appreciated that when the machine is shut off or prepared for transport, the vacuum supplied to the space 30 between the piston 25 and end cap 26 is also shut off. When the vacuum in the space 30 diminishes to the point where it is overcome by the weight of the milking claw suspended from hook 45, the milking claw drops to the ground, thereby increasing its risk of milking claw contamination. Such contamination is undesirable because it necessitates cleansing of the milking claw before it can again be coupled to another animal. This cleansing is both time consuming and a hinderance to the smooth operation of the dairy. The present invention overcomes this problem altogether by preventing dropping of the milking claw to the ground even when the vacuum source to the housing 22 is disconnected.

In one aspect of the first embodiment of the invention, as shown in FIGS. 1 and 2, the milking claw is retained in a retracted position adjacent aperture 44 by a retaining assembly designated generally by reference numeral 48. The retaining assembly 48 is provided adjacent closure cap 27 and includes a retainer housing 50 having first and second housing halves 50a and 50b secured together along their respective lateral edges by suitable securing means, such as a suitable adhesive or fastening member 53. Housing halves 50a and 50b define a chamber 51 which is divided by a diaphragm 52 into lateral and medial sections 51a and 51b, respectively. Diaphragm 52 is secured in place along its lateral edges 54, which edges are sandwiched between mating edges of housing halves 50a and 50b, to isolate the chamber halves from one another. The position of the diaphragm 52 within chamber 51 is displaceable to vary the position of a reciprocably extensible pin member 56 with respect to aperture 44, as set forth in detail below.

Diaphragm 52 is resiliently biased to the position illustrated in FIG. 1 by biasing or spring member 58 positioned between the diaphragm and back wall 60 of the lateral retainer housing half 50a. Spring member 58 is retained in position adjacent wall 60 by suitable retaining means, such as retainer lip 62 partially overlapping the spring base 64. The upper portion 66 of the spring 58 impinges upon plate member 68 adjacent diaphragm 52 to urge the diaphragm away from back wall 60 to the position shown in FIG. 1. Movement of the diaphragm 52 in this manner urges pin member 56 through guide passage 70 formed in closure cap 27 across the aperture 44, as shown more clearly in FIG. 2. Pin 56 is connected to diaphragm 52 through plate member 72 positioned opposite corresponding plate member 68. Extension of pin member 56 across aperture 44 to the position shown in FIGS. 1 and 2 obstructs the passage of the retaining member 46 secured to cord 40, thereby preventing passage of the cord through the aperture 44.

The position of the diaphragm 52 within housing chamber 51, and therefore the position of pin member 56 with respect to aperture 44, is related to the relative ambient pressures in housing chamber sections 51a and 51b. When the ambient pressure in lateral chamber half 51a exceeds that of chamber half 51b, the spring 58 urges the diaphragm 52 toward aperture 44, thereby directing pin 56 across the aperture. However, when ambient pressure within medial chamber 51b exceeds that of lateral chamber 51a and the force of spring 58, as occurs when negative pressure is supplied to chamber 51a, atmospheric pressure urges diaphragm 52 away from aperture 44 and toward back wall 60, compressing spring 58. As the spring is compressed, pin member 56 is drawn away from aperture 44 to permit free passage of cord 40 and attached retaining member 46 therethrough. Negative pressure is selectively supplied to the chamber 51 through housing inlet 74 formed in the back wall 60 of lateral chamber half 50a. Vacuum inlet 74 is coupled to the vacuum supply of the milking machine. Counteracting atmospheric pressure is supplied through inlet 76 formed in housing wall 55 of medial housing half 50b. Pin 56 will remain in a retracted position for as long as sufficient negative pressure is supplied to chamber half 51a.

When the milking machine is put into operation, negative pressure is supplied to vacuum inlet 28 of end cap 26 through a suitable control valve (not shown) to draw piston 25 toward the end cap. Simultaneously, negative pressure is supplied to the cord retaining unit 48 through inlet 74. With the application of negative pressure through inlet 74, atmospheric pressure acts against diaphragm 52 and overcomes the force of the spring 58 to urge the spring toward the back wall 60 of lateral housing half 50a. Movement of the spring 58 in this manner retracts the pin member 56 from the aperture 44. With the pin 56 thus retracted, the machine operator shuts off the vacuum supply to inlet 28 to permit withdrawal of cord 40 from the housing 22 and coupling of the milking claw to the cow. When the milk flow detector of the milking machine detects that the flow of milk from the cow has diminished to a predetermined level, the milking claw is disengaged from the cow (preferably automatically, in a known manner, as described in U.S. Pat. No. 3,690,300 above) and negative pressure is supplied to the housing 22 through inlet 28 to draw piston 25 toward end cap 26. As noted previously, withdrawal of piston 25 in this manner retracts cord 40 into the housing 22, thereby elevating the milking claw away from the cow.

Prior to transporting the milking machine to another location, the supply of negative pressure to chamber section 51a is shut off, and all electrical and vacuum line connections are disconnected. With the removal of vacuum from chamber section 51a of the retaining unit 48, atmospheric pressure across diaphragm 52 is equalized and spring 58 extends, thereby directing pin 56 across aperture 44. With the uncoupling of the vacuum supply to the housing 22, gravity draws piston 25 toward closure cap 27. However, because pin 56 partially obstructs aperture 44, only the portion of the cord 40 extending between the retaining member 46 and claw hook 45 passes through the aperture 44. The retaining member 46 is blocked by the pin 56 and therefore cannot pass through the aperture. As a result, the milking claw coupled to the hook 45 cannot drop to the ground.

Figures 3, 4, 5:
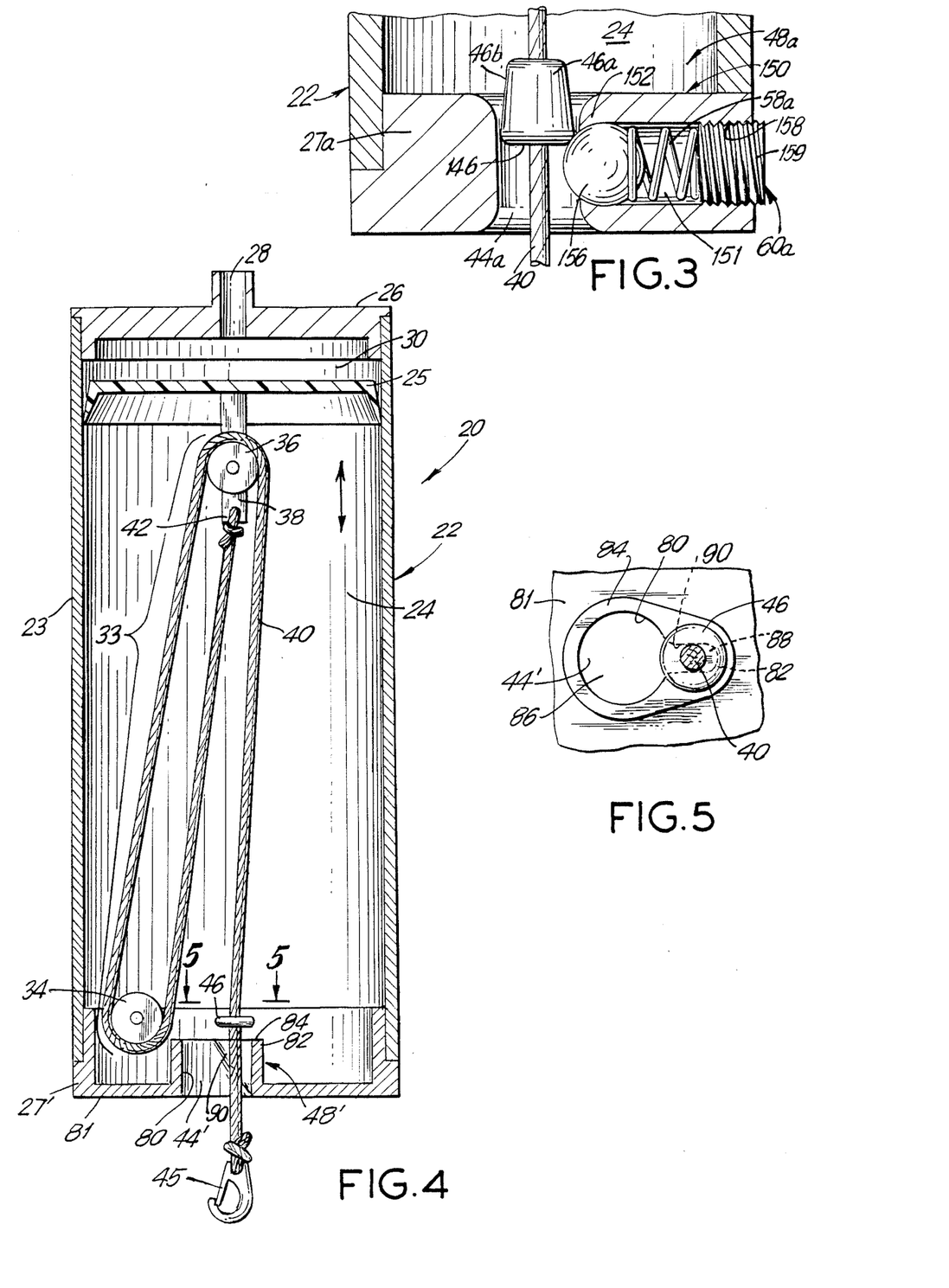
FIG. 3 is a sectional view of the lower end of another aspect of the first embodiment of the invention.
FIG. 4 is a sectional view of another aspect of the first embodiment of the invention.
FIG. 5 is a view along the line 4—4 of FIG. 4.

In another aspect of the invention, as shown in FIG. 3, the retaining assembly 48a is formed integrally with closure cap 27a and includes a spring-biased check ball 156 for controlling the passage of cord 40 through the housing aperture 44a. With the exception of the operation of the retaining assembly 48a described below, the operation of this aspect of the invention is substantially similar to that depicted in FIG. 1. The check ball 156 is positioned within retainer assembly housing 150 adjacent biasing member 58a, which is mounted within the assembly housing cavity 151. The biasing member 58a, which in this depicted arrangement is in the form of a spring, may include other biasing means such as pneumatic or hydraulic biasing means and is provided to resiliently urge the check ball 156 into aperture 44a. Inwardly turned ends 152 of the assembly housing 150 limit the extent to which the check ball extends into the aperture 44a.

A lower end 146 of cord retaining member 46a abuts against check ball 156 when the supply of negative pressure to the space 30 above the piston 25 (FIG. 1) has been terminated. Spring 58a exerts a force against back wall 60a of the retaining assembly 48a and the check ball 156 to resist inward deflection of the check ball and passage of the retaining member 46a through the aperture. The force exerted by the spring 58a is selectively variable through inward or outward movement of the back wall 60a so that an appropriate spring resistance can be obtained. Threads 156 formed along the outer surface of the back wall 60a cooperate with corresponding grooves 158 formed along the inner surface of the retainer assembly housing 150 to fix the position of the back wall at the desired position.

When an animal is to be milked, cord 40 is pulled with sufficient force to overcome the resistance exerted by the spring-mounted check ball so that a sufficient cord length can be obtained to permit coupling of the attached milking claw to the animal. When the flow of milk diminishes to a predetermined level, the milking claw is uncoupled from the animal and the cord is withdrawn into the housing cavity 24 in the manner described above by movement of the piston 25 toward end cap 26. Movement of the retaining member 46a past the check ball 156 is facilitated by configuring the side wall 46b with an inward taper.

In the aspect of the invention shown in FIGS. 4 and 5, the retaining assembly 48, is contiguous with aperture 44, of closure cap 27'. Aperture 44' is defined by a wall 80 which extends generally traversely of the bottom wall 81 of closure cap 27'. Extending across the upper end 82 of wall 80 is aperture plate 84 in which aperture 44' is formed. As is more clearly shown in FIG. 5, aperture 44' is configured in the form of a key slot having a broad section 86 continuous with a narrow section 88. Broad aperture section 86 is dimensioned to permit passage of cord 40 and attached retaining member 46 therethrough. In contrast, the narrow aperture section 88 is dimensioned to permit passage only of cord 40 therethrough. The passage of retaining member 46 is obstructed by aperture plate 84. Guide wall 90 (FIG. 4) adjacent narrow aperture section 88 extends from bottom wall 81 of closure cap 27' toward broad aperture section 86 to guide the cord 40 and attached retaining member 46 toward the broad section 86 of the aperture as the cord is retracted into the housing by movement of the piston toward end cap 26, as set forth above in connection with the embodiment depicted in FIGS. 1–3.

As with the previously discussed embodiment of FIGS. 1–3, when the milking claw is to be coupled to the cow, the supply of negative pressure to inlet 28 is shut off and the machine operator pulls cord 40 toward aperture portion 86 until retaining member 46 passes therethrough. A sufficient length of cord is retracted to permit coupling of the milking claw to the cow to be milked. Once the milking claw is coupled to the cow, monitoring of the cow's milk flow proceeds in the manner discussed above. Once the milk flow drops to the predetermined minimum flow level, the milking claw is disconnected (preferably automatically, as discussed above) from the animal. Substantially simultaneously, negative pressure is supplied to inlet 28 to draw piston 25 to a position adjacent end cap 26. As the piston is drawn toward the end cap, cord 40 is retracted into the housing 22. In addition, as the retainer 46 is drawn toward aperture 44', it is directed to broad section 86 of the aperture by guide wall 90. Because aperture 44' is positioned between pulley wheels 36 and 34 along the closure cap 27', once the retainer 46 passes through aperture section 86 into the housing cavity 24, the retainer 46 is drawn back toward narrow aperture section 88 as the cord is further retracted into the housing. When the operator prepares to transport the milking machine to another location by uncoupling the milk line, electrical and vacuum connections, only a predetermined length of cord 40 extends through aperture 44' due to abutment of retaining member 46 against the section of the aperture plate 84 defining the narrow aperture section 88. Because the retaining member 46 cannot pass through the aperture section 88, the incidence of contamination of the milking claw coupled to the cord 40 is reduced, as the length of cord extending outwardly from the aperture 44' is selected so as to prevent dropping of the claw to the ground.

Figure 6:
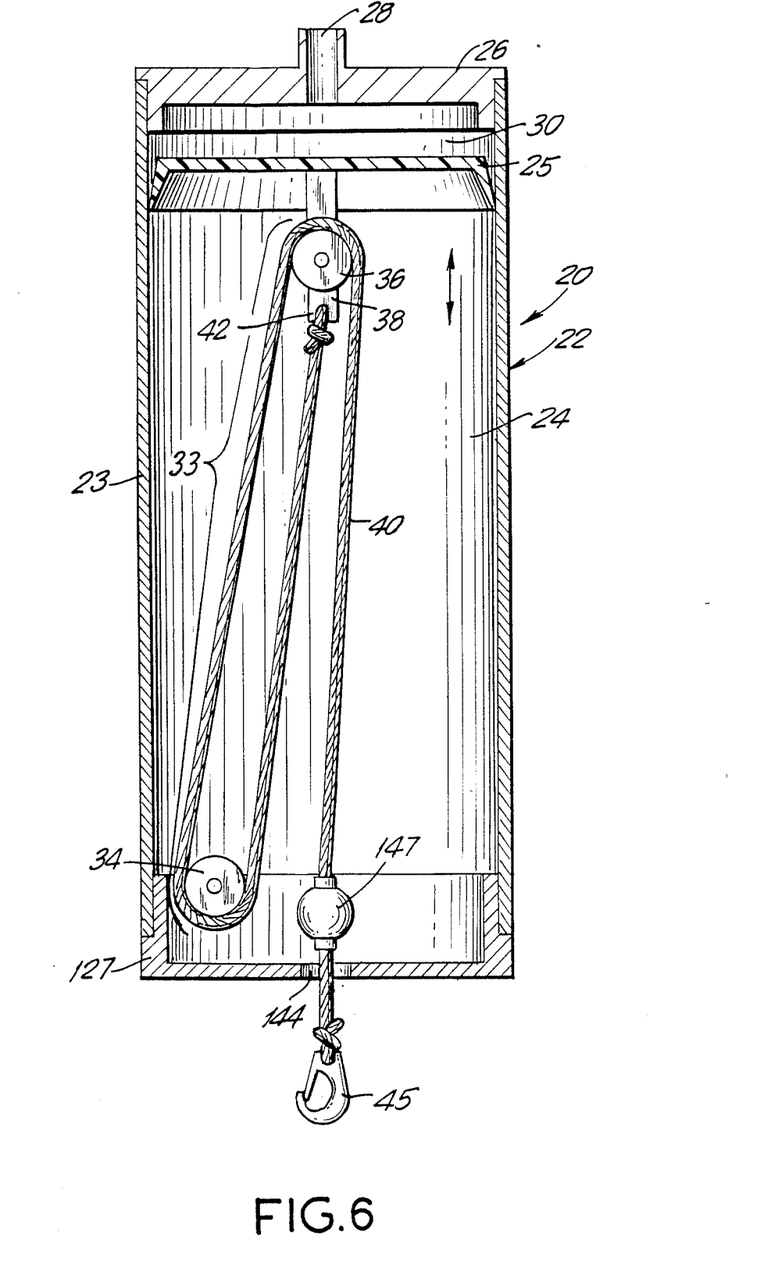
FIG. 6 is a sectional view of another aspect of the first embodiment of the invention.

In another aspect of the first embodiment, as illustrated in FIG. 6, retaining member 147 of cord 40 is in the form of a deformable ball having a cross-sectional width in excess of the diameter of aperture 144 formed in closure cap 127. Deformable ball 147 is formed from a suitably deformable material such that the ball deforms and compresses slightly to reduce its crosssectional width as it is pulled through the aperture 144 upon withdrawal of cord 40 from the housing 22. The physical properties of the material forming the ball 147 are such that a force in excess of the weight of the milking claw coupled to hook 45 is required to pull to ball 147 through aperture 144. When the flow of milk diminishes to the predetermined level, the supply of vacuum to the milking claw is shut off, thereby uncoupling the milking claw from the cow. Substantially simultaneously, vacuum is applied to inlet 28 to draw piston 25 toward end cap 26, as discussed above. A vacuum of sufficient force is applied to the space 30 so that the ball 147 is sufficiently deformed to permit passage through the aperture 44 and into the housing cavity 24. When the supply of vacuum to housing inlet 28 is shut off, as when the machine is to be transported to another area, only the portion of the cord between the retained ball 147 and claw hook 45 passes through aperture 144 due to the physical properties of retainer 147 and its dimensions relative to aperture 144. Because the weight of the milking claw is insufficient to deform the retainer 147 sufficiently to pass through aperture 144, the incidence of milking claw contamination resulting from dropping of the claw to the ground is reduced.

Figure 7:
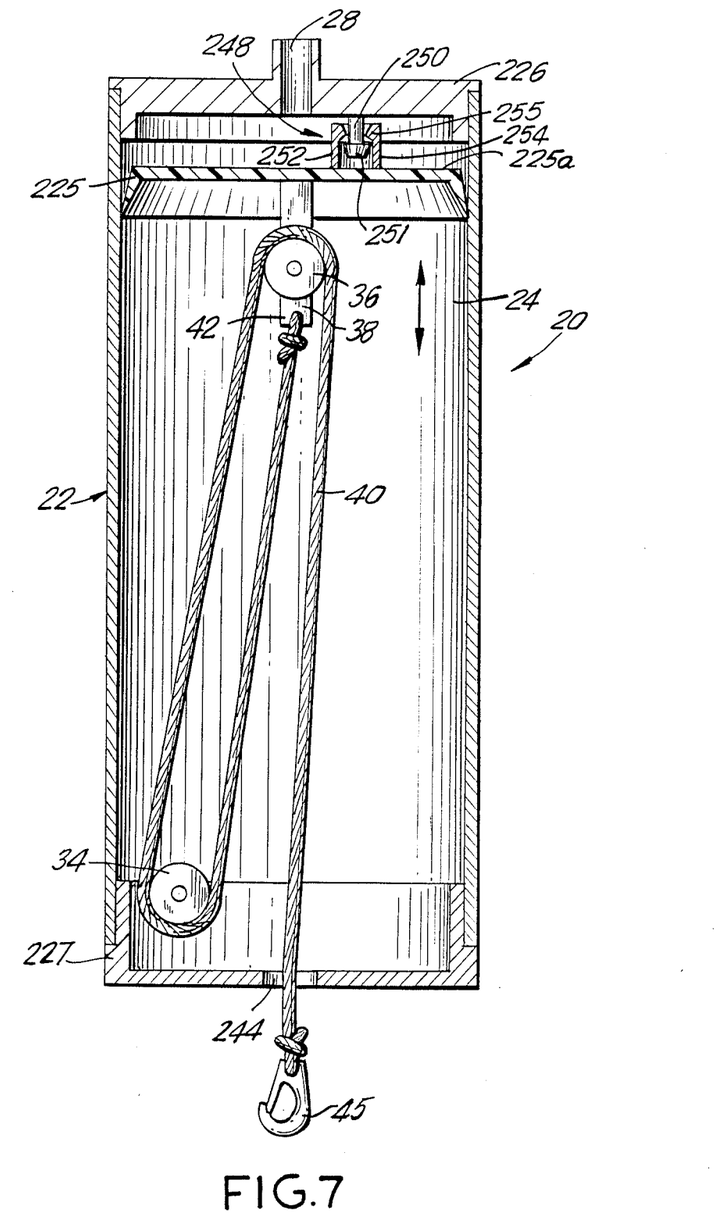
FIG. 7 is a sectional view of a second embodiment of the invention.

In a second embodiment, as shown in FIG. 7, the cord retaining member 248 comprises a pin and latch coupling. A latch pin 250 extends generally transversely from end cap 226 toward the upper surface of piston 225. The pin 250 includes an enlarged diameter head portion 251 and is dimensioned to cooperate with latch receptacle 252 positioned along the opposing, upper surface 225a of piston 225. Alternatively, the respective positions of the pin and latch receptacle members can be reversed such that pin 250 extends generally transversely from piston 225 and the latch receptacle 252 extends from the end cap 226. The latch receptacle 252 includes a spring-biased wall 254 having inwardly-facing flanges 255 dimensioned to retain the head portion 25 of the pin 250 once the piston 225 has been drawn by vacuum pressure to a position adjacent end cap 226.

When a cow is to be milked, the machine operator pulls cord 40 through aperture 244 formed in closure cap 227 so that a sufficient length of cord is obtained to permit coupling of the milking claw to the cow. The pulling force applied to the cord 40 must be sufficient to deform the wall 254 outwardly to uncouple the receptacle housing 252 from the latch pin 250. When the detected flow of milk has diminished to a predetermined minimum level, the milking claw is uncoupled from the cow and vacuum is supplied to inlet 28 in the manner set forth above to retract piston 225 toward end cap 226, thereby withdrawing cord 40 into the housing 22. The piston 22 is retracted with sufficient force to permit passage of pin head portion 251 through flanges 255 of receptacle housing 252. The receptacle walls 254, and particularly flanges 255 thereof, are dimensioned to facilitate passage of pin head 251 both in to and out from receptacle housing 252. Receptacle housing 252 is configured such that a force in excess of the weight of the piston, milking claw, cord and associated cord retraction means 33 (see FIG. 6) is required to uncouple the pin 250 from the housing. Therefore, when piston 225 is retracted so that the pin enters receptacle housing 252, only a predetermined length of cord 40 extends outwardly from aperture 244, even when the vacuum to housing inlet 28 is shut off, as occurs when the milking machine is transported from one location to another.

What is claimed is:

1. An apparatus for removing a milking cluster from an animal to be milked and retaining the milking cluster in a predetermined position, the milking cluster being removably connected to a milk line and a vacuum line of a milking machine, comprising:

a cylindrical housing having a wall that defines a generally cylindrical housing cavity, said housing having first and second ends;

a piston reciprocable within said housing cavity between said housing ends;

means for selectively introducing negative pressure between said first housing end and said piston to move said piston to a position adjacent said first housing end;

retractable cord means comprising a cord having first and second ends, said first cord end being coupled to said piston and said second cord end extending through an aperture formed in said second housing end and having means for coupling with the milking cluster, said cord having a length at least a portion of which adjacent said second cord end extends outwardly from said housing aperture when said negative pressure is applied between said first housing end and said piston and said cord is retracted into said housing;

reciprocably extensible means to at least partially obstruct said aperture; and means for fixing the length of cord extending outwardly from said housing aperture so that the milking cluster is retained in a predetermined position adjacent said aperture after said piston has been drawn to said position adjacent said first housing end, said length fixing means being operable following cessation of the supply of negative pressure.

2. An apparatus according to claim 1, wherein said cord length fixing means further comprises a retaining member secured to said cord, said reciprocably extensible means comprising pressure responsive retaining means comprising a pin member biased to at least partially occlude said aperture to prevent passage of said cord retaining member through said aperture, said pin member being retractable from said aperture in response to negative pressure selectively supplied to said retaining means.

3. An apparatus according to claim 2, wherein said pressure responsive retaining means further comprises a cylindrical housing having a diaphragm member which divides said housing into first and second chamber portions, said first chamber portion comprising pin member biasing means and means for introducing negative pressure to said housing of said retaining means.

4. An apparatus according to claim 3, wherein said second chamber portion comprises means for receiving atmospheric pressure, said atmospheric pressure urging said pin member away from said aperture when the pressure in said second chamber portion exceeds the combination of the pressure in said first chamber portion with the force exerted by said biasing means.

5. An apparatus according to claim 1, wherein said reciprocably extensible means comprises check means biased by a spring member.

6. An apparatus according to claim 5, wherein said cord length fixing means further comprises a retaining member secured to said cord, said retaining member having a side wall which is tapered inwardly toward said housing.

7. An apparatus according to claim 5, wherein said spring member is interposed between said check means and a wall member, said wall member being selectively movable relative to said check means to vary the force extended by said spring against said check means.

8. In an apparatus for removing a milking claw from an animal and retracting the claw therefrom, the milking claw being connectable to a milk line and a vacuum line of a milking machine, the apparatus comprising a cylindrical housing having a generally cylindrical housing cavity having first and second housing ends, a piston reciprocable within the cavity between the housing ends, an inlet adjacent said first housing end for selectively introducing negative pressure into the space between the piston and said first housing end, and a cord having one end coupled to the piston and the other end extending through an aperture in said second housing end for coupling with the milking claw, said negative pressure being supplied to draw said piston to a position adjacent said first housing end and thereby retract said cord into said housing, the improvement comprising means for fixing the length of cord extending outwardly from said housing through said aperture following retraction of the milking claw from the animal and cessation of the introduction of negative pressure to the space between the piston and the first housing end wherein a retaining member is secured to a predetermined portion of the cord and further comprising means for selectively obstructing at least a portion of said aperture to prevent passage of said retaining member through said aperture.

9. An apparatus according to claim 8, wherein said means for selectively obstructing at least a portion of said aperture comprises pressure responsive means comprising a retainer housing having a pin member biasing means to at least partially obstruct said aperture, said pin member being retractable from said aperture when sufficient negative pressure is selectively supplied to said retainer housing.

10. An apparatus according to claim 9 wherein said retainer housing further comprises a diaphragm dividing said retainer housing into first and second chamber portions, said first chamber portion comprising said pin member biasing means and means for introducing negative pressure to said retainer housing.

11. An apparatus according to claim 10, wherein said second chamber portion comprises means for receiving atmospheric pressure, said pin member being retracted from said aperture when the pressure in said second chamber portion exceeds the combination of the pressure in said first chamber portion with the force exerted by said pin member biasing means.

12. An apparatus according to claim 8, wherein said means for selectively obstructing at least a portion of said aperture comprises check means biased into said aperture by a spring member.

13. An apparatus according to claim 12, wherein said retaining member includes a side wall which is tapered inwardly toward said housing.

14. An apparatus according to claim 12, wherein said spring member is interposed between said check means and a wall member, said wall member being selectively movable relative to said check means to vary the force exerted by said spring member against said check means.

15. An apparatus for removing a milking cluster from an animal to be milked and retaining the mixture cluster in a predetermined position, the mixing cluster being removably connected to a milk line and a vacuum line of a milking machine, comprising:
a cylindrical housing having a wall that defines a generally cylindrical housing cavity, said housing having first and second ends;
a piston reciprocable within said housing cavity between said housing ends;
means for selectively introducing negative pressure between said first housing end and said piston to move said piston to a position adjacent said first housing end;
retractable cord means comprising a cord having first and second ends, said first cord end being coupled to said piston and said second cord end extending through an aperture formed in said second housing end and having means for coupling with the milking cluster, said cord having a length at least a portion of which adjacent said second cord end extends outwardly from said housing aperture when said negative pressure is applied between said first housing end and said piston and said cord is retracted into said housing; and
means for fixing the length of cord extending outwardly from said housing aperture so that the milking cluster is retained in a predetermined position adjacent said aperture after said piston has been drawn to said position adjacent said first housing end, said length fixing means being operable following cessation of the supply of negative pressure and wherein said length fixing means comprises deformable retaining means secured to said cord, said deformable retaining means being configured to deform and pass through said aperture upon application of a deformation force in excess of a predetermined minimum value, said predetermined value exceeding the force generated by the weight of the milking cluster suspended from said second cord end.

16. An apparatus for removing a milking cluster from an animal to be milked and retaining the milking cluster in a predetermined position, the milking cluster being removably connected to a milk line and a vacuum line of a milking machine comprising:

a cylindrical housing having a wall that defines a generally cylindrical housing cavity, said housing having first and second ends;

a piston reciprocable within said housing cavity between said housing ends;

means for selectively introducing negative pressure between said first housing end and said piston to move said piston to a position adjacent said first housing end;

retractable cord means comprising a cord having first and second ends, said first cord end being coupled to said piston and said second cord end extending through an aperture formed in said second housing end and having means for coupling with the milking cluster, said cord having a length at least a portion of which adjacent said second cord end extends outwardly from said housing aperture when said negative pressure is applied between said first housing end and said piston and said cord is retracted into said housing; and means for fixing the length of cord extending outwardly from said housing aperture so that the milking cluster is retained in a predetermined position adjacent said aperture after said piston has been drawn to said position adjacent said first housing end, said length fixing means being operable following cessation of the supply of negative pressure and wherein said length fixing means comprises a pin and latch coupling, said pin extending from either of said first housing end or said piston and having an outwardly flared head portion, said latch being positioned along an opposed surface of the other of said first housing end or said piston and being configured to resiliently engage said head portion of said pin to retain said piston adjacent said first housing end when said negative pressure has drawn said piston to said position adjacent said first housing end, but to release said pin when said piston is drawn toward said second housing end by a force in excess of the force generated by the weight of the milking cluster suspended from said second cord end.

17. An apparatus for removing a milking cluster from an animal to be milked and retaining the milking cluster in a predetermined position, the milked and retaining the milking cluster in a connected to a milk line and a vacuum line of a milking machine, comprising:

a cylindrical housing having a wall that defines a generally cylindrical housing cavity, said housing having first and second ends;

a piston reciprocable within said housing cavity between said housing ends;

means for selectively introducing negative pressure between said housing end and said piston to move said piston to a position adjacent said first housing end;

retractable cord means comprising a cord having first and second ends, said first cord end being coupled to said piston and said second cord end extending through an aperture formed in said second housing end and having means for coupling with the milking cluster, said cord having length at least a portion of which adjacent said second cord end extends outwardly from said housing aperture when said negative pressure is applied between said first housing end and said piston and said cord is retracted into said housing; and means for fixing the length of cord extending outwardly from said housing aperture so that the milking cluster is retained in a predetermined position after said piston has been drawn to said position adjacent said first housing end, said length fixing means being operable following cessation of the supply of negative pressure and wherein said cord length fixing means comprises a retaining member secured to said cord, said retaining member being positioned adjacent said aperture when said piston is retracted to said position adjacent said first housing end and further wherein said aperture comprises first and second aperture sections, said first aperture section being dimensioned so as to prevent passage of said retaining member therethrough, said second aperture section being dimensioned to permit passage of said retaining member therethrough.

18. An apparatus according to claim 17, wherein said first aperture section is defined by a wall extending at an angle outwardly and away from said second aperture section.

19. In an apparatus for removing a milking claw from an animal and retracting the claw therefrom, the milking claw being connectable to a milk line and a vacuum line of a milking machine, the apparatus comprising a cylindrical housing having a generally cylindrical housing cavity having first and second housing ends, a piston reciprocable within the cavity between the housing ends, an inlet adjacent said first housing end for selectively introducing negative pressure into the space between the piston and said first housing end, and a cord having one end coupled to the piston and the other end extending through an aperture in said second housing end for coupling with the milking claw, said negative pressure being supplied to draw said piston to a position adjacent said first housing and thereby retract said cord into said housing, the improvement comprising means for fixing the length of cord extending outwardly from said housing through said aperture following retraction of the milking claw from the animal and cessation of the introduction of negative pressure to the space between the piston and the first housing end wherein a retaining member is secured to a predetermined portion of the cord and further wherein said aperture comprises first and second aperture sections, said first aperture section being dimensioned so as to prevent passage of said retaining member therethrough, said second aperture section being dimensioned to permit passage therethrough of said retaining member.

20. An apparatus according to claim 19, wherein said first aperture section comprises means for guiding said retaining member toward said second aperture portion as said cord is retracted into said housing.

21. An apparatus according to claim 20, wherein said retaining member guiding means comprises a wall member angled outwardly and away from said second aperture section.

22. In an apparatus for removing a milking claw from an animal and retracting the claw therefrom, the milking claw being connectable to a milk line and a vacuum line of a milking machine, the apparatus comprising a cylindrical housing having a generally cylindrical housing cavity having first and second housing ends, a piston reciprocable within the cavity between the housing ends, an inlet adjacent said first housing end for selectively introducing negative pressure into the space between the piston and said first housing end, and cord having one end coupled to the piston and the other end extending through an aperture in said second housing end for coupling with the milking claw, said negative pressure being supplied to draw said piston to a position adjacent said first housing end and thereby retract said cord into said housing, the improvement comprising means for fixing the length of cord extending outwardly from said housing through said aperture following retraction of the milking claw from the animal and cessation of the introduction of negative pressure to the space between the piston and the first housing end wherein a retaining member is secured to a predetermined portion of the cord.

23. An apparatus according to claim 22, wherein said retaining member is deformable to permit passage of said cord outwardly through said aperture upon application of a sufficient force of removal to said cord, said retaining member being configured to prevent passage of said cord through said aperture when said retaining member has been withdrawn into said housing in the absence of the deformation of said retaining member.

24. In an apparatus for removing a milking claw from an animal and retracting the claw therefrom, the milking claw being connectable to a milk line and a vacuum line of a milking machine, the apparatus comprising a cylindrical housing having a generally cylindrical housing cavity having first and second housing ends, a piston reciprocable within the cavity between the housing ends, an inlet adjacent said first housing end for selectively introducing negative pressure into the space between the piston and said first housing end, and a cord having one end coupled to the piston and the other end extending through an aperture in said second housing end for coupling with the milking claw, said negative pressure being supplied to draw said piston to a position adjacent said first housing end and thereby retract said cord into said housing, the improvement comprising means for fixing the length of cord extending outwardly from said housing through said aperture following retraction of the milking claw from the animal and cessation of the introduction of negative pressure to the space between the piston and the first housing end, said means for fixing the cord length further comprising a pin and latch coupling, said pin extending from either said first housing end or said piston and having an outwardly flared head portion, said latch being positioned along an opposed surface of the other of said first housing end or said piston and facing said pin member, said latch having a resiliently deformable wall for engaging and retaining said head portion of said pin when said piston has been drawn to said position adjacent said first housing end.

* * * * *

UNITED STATES PATENT AND TRADEMARK OFFICE
CERTIFICATE OF CORRECTION

PATENT NO. : 4,838,203

DATED : June 13, 1989

INVENTOR(S) : MICHAEL W. ELLIS et al.

It is certified that error appears in the above-identified patent and that said Letters Patent is hereby corrected as shown below:

Col. 4, line 24, change "4-4" to -- 5-5 -- .

Col. 5, line 50, change "5" to -- 25 -- .

Col. 8, line 17, change "156" to -- 159 -- .

Col. 8, line 35, change "48;" to -- 48' -- .

Col. 8, line 35, change "44;" to -- 44' -- .

Col. 9, line 45, change "44" to -- 144 -- .

Col. 10, line 2, change "25" to -- 251 -- .

Col. 10, line 16, change "22" to -- 225 -- .

Col. 13, line 50, after the comma (,), delete "the milked and retaining".

Col. 13, line 51, after "cluster" delete "in a" and substitute -- being removably -- .

UNITED STATES PATENT AND TRADEMARK OFFICE
CERTIFICATE OF CORRECTION

PATENT NO. : 4,838,203
DATED : June 13, 1989
INVENTOR(S) : MICHAEL W. ELLIS et al.

It is certified that error appears in the above-identified patent and that said Letters Patent is hereby corrected as shown below:

Col. 13, line 67, after "having" insert -- a -- .

Col. 14, line 41, after "housing" insert -- end -- .

Col. 15, line 4, before "cord" insert -- a -- .

Signed and Sealed this

Fifth Day of June, 1990

*Attest:*

HARRY F. MANBECK, JR.

*Attesting Officer*       *Commissioner of Patents and Trademarks*